United States Patent Office 3,394,198
Patented July 23, 1968

3,394,198
ALKYLIDENE SUBSTITUTED NORBORNENE
Keith M. Taylor, Ballwin, Mo., assignor to Monsanto Company, St. Louis, Mo., a corporation of Delaware
No Drawing. Filed Mar. 9, 1966, Ser. No. 532,844
13 Claims. (Cl. 260—666)

ABSTRACT OF THE DISCLOSURE

A process for the preparation of alkylidene substituted norbornenes by heating an acyclic diene of the formula

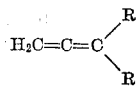

in which R represents hydrogen or a monovalent hydrocarbon radical, in the absence of a polymerization initiator, with a cyclopentadiene of the formula

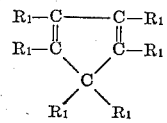

in which $R_1$ is hydrogen or an alkyl group of 1 to 6 carbon atoms, at a temperature of 255 to 325° C.

---

The present invention relates to a process for producing cyclic hydrocarbons. More particularly, the present invention relates to a process for the reaction of an acyclic diene with a cyclopentadiene to produce a cyclic hydrocarbon compound useful in the production of polymers.

Recently, there has been disclosed a group of cyclic hydrocarbons having excellent utility as monomers for the production of useful polymers. These cyclic hydrocarbons, hereinafter referred to as alkylidene substituted norbornenes, have the following structural formula

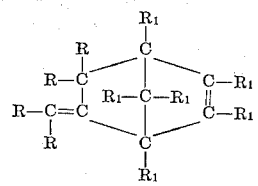

wherein each R represents hydrogen or a monovalent hydrocarbon radical of from 1 to 6 carbon atoms, with both R's on a single carbon being hydrogen when an R on the other carbon is hydrocarbon; and each $R_1$ represents hydrogen or a lower alkyl group, preferably hydrogen. These compounds are taught as being prepared by heating an acyclic diene in the absence of a polymerization initiator with a cyclopentadiene at a temperature of 150 to 250° C., preferably 175 to 225° C. This method of preparing the alkylidene substituted norbornenes has not proven to provide as high yields of these compounds as desired. Further, significant quantities of by-products are produced by this method thus creating a problem of purification of the desired alkylidene substituted norbornenes.

It is an object of the present invention to provide a new and improved process for the preparation of cyclic hydrocarbons having excellent utility as monomers for the production of useful polymers. Another object of the present invention is to provide a new and improved process for the preparation of alkylidene substituted norbornenes. Still another object of the present invention is to provide a new and improved process for the preparation of alkylidene substituted norbornenes by the reaction of acyclic dienes and a cyclopentadiene whereby substantially improved yields of the product alkylidene substituted norbornenes are obtained. Another object of the present invention is to provide a new and improved process for the preparation of alkylidene substituted norbornenes by the reaction of an acyclic diene and a cyclopentadiene whereby the quantity of by-products produced is substantially reduced. Additional objects will become apparent from consideration of the following description of the invention herein disclosed.

The present invention, which fulfills these and other objects, is a process for the preparation of alkylidene substituted norbornenes which comprises heating an acyclic diene of the formula

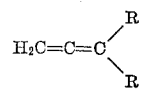

in which R represents hydrogen or a monovalent hydrocarbon radical, in the absence of a polymerization initiator, with a cyclopentadiene of the formula

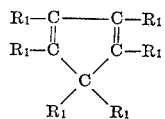

in which $R_1$ is hydrogen or an alkyl group of 1 to 6 carbon atoms, at a temperature of 255 to 325° C.

Several advantages result from use of the process of the present invention to prepare alkylidene substituted norbornenes. As a result of the present process, higher yields of product alkylidene substituted norbornene is obtained. Further, a lesser quantity of by-products is produced by the process of the present invention. In addition, reaction of the acyclic diene and the cyclopentadiene is much faster under the process of the present invention, therefore allowing for the production of a greater amount of alkylidene substituted norbornene per unit time. Other advantages will become apparent from consideration of the detailed description of the present invention hereinbelow presented.

In order to further describe as well as to illustrate the present invention, the following examples are presented. These examples are not to be construed as limiting the present invention.

EXAMPLE I

Two reaction runs were made in order to demonstrate the advantages to be obtained through the process of the present invention. One of the runs, hereafter referred to as Run A, was carried out in accordance with the process of the present invention, while the other run, hereafter referred to as Run B, was carried out under conditions not in accordance with the process of the present invention. These runs were carried out in the following manner:

Run A

Ninety-nine (99) grams of dicyclopentadiene (1.5 moles as cyclopentadiene), 17.9 grams of benzene and 0.5 gram p-t-butylcatechol were placed in a 300 ml. stainless steel autoclave. The autoclave was flushed with nitrogen, cooled and 60 grams of allene (1.5 moles) was introduced into the autoclave. The reaction mixture was then rapidly heated to 260° C. under autogenous pressure. On reaching 260° C., the pressure was found to be 920 p.s.i.g. The temperature continued to increase for 3 to 5 minutes after reaching the 260° C. level to a new temperature of 275 to 280° C., however, the pressure fell rapidly to 450 p.s.i.g. during this period of temperature increase. During the next nine minutes, the pressure dropped to 350 p.s.i.g. at substantially which level it remained throughout the remainder of the reaction period.

On analysis of the reaction product, it was found that a yield of 5-methylene-2-norbornene of about 60% of theoretical (based on allene) was obtained. It was also found during this run that reaction was essentially complete within 20 minutes after reaching the 260° C. temperature level. On distillation of the product which was a water-fluid yellow liquid, it was found that no close-boiling or difficultly separable impurity was present.

Run B

This run was carried out under the same conditions as Run A with the exception of temperature and the resulting autogenous pressures. In this run, the temperature was brought up to an initial temperature of 200° C. at which temperature the pressure was ascertained to be 700 p.s.i.g. The temperature remained relatively constant throughout the period of the run but with a gradual increase in pressure over 35 minutes to 800 p.s.i.g. after which the pressure dropped slowly over a 2 hour period to about 400 p.s.i.g.

In this run, the yield of 5-methylene-2-norbornene was approximately 50% of theoretical (based on allene). Completion of reaction under these conditions required approximately two hours. On distillation of the product of this run, the product 5-methylene-2-norbornene was found to be contaminated with approximately 2.5% by volume of a slightly higher boiling impurity which is not readily separated from the 5-methylene-2-norbornene by fractionation.

EXAMPLE II

A reaction run was carried out under substantially the same conditions as Run B of Example I except the temperature was slightly lower being about 180 to 195° C. Pressure was autogenous. The most significant difference was that hydroquinone was used as the inhibitor. The yield was 42.5% and a substantial quantity of polymer was produced.

Comparison of Runs A and B of Example I above demonstrates a substantial increase in reaction rate and yields of the product 5-methylene-2-norbornene from use of the process of the present invention. In addition, and quite surprisingly, the 5-methylene-2-norbornene produced in accordance with the process of the present invention is of higher purity than that produced by conventional means. By comparison of Example II above with Example I, and particularly Run B of Example I, the criticality in choice of inhibitor is readily apparent.

The acyclic dienes which are reactants in the present process have the formula

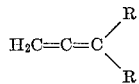

in which R represents hydrogen or a monovalent hydrocarbon radical. The R's can be the same or different. If R is an alkyl radical, it is preferred that it be one of 1 to 6 carbon atoms. It is further preferred that the alkyl radical be straight-chain. Several non-limiting examples of acyclic dienes useful in the process of the present invention are propadiene, 1,2-butadiene, 1,2-pentadiene, 1,2-hexadiene, 1,2-heptadiene, 1,2-octadiene, 1,2-nonadiene, 3-methyl - 1,2-butadiene, 3-methyl - 1,2-pentadiene, 3-methyl-1,2-hexadiene, 3-methyl - 1,2-nonadiene, 3-ethyl-1,2-butadiene, 3-ethyl - 1,2-heptadiene, 3-propyl - 1,2-butadiene, 3-butyl-1,2-octadiene, and the like. The preferred acyclic dienes for use in the present invention are those in which at least one of the R's is hydrogen and the other R is hydrogen or an alkyl radical of 1 to 3 carbon atoms. A particularly useful acyclic diene is propadiene.

The other reactant in the process of the present invention is a cyclopentadiene of the formula

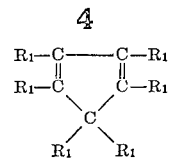

in which $R_1$ is hydrogen or an alkyl group of 1 to 6 carbon atoms. The $R_1$'s can be the same or different and, if alkyl groups, may be straight-chain or branched-chain. Most often, not more than two of the $R_1$'s are alkyl groups. Several non-limiting examples of cyclopentadienes which may be used in the present invention are cyclopentadiene, 5-methylcyclopentadiene, 5-ethylcyclopentadiene, 5-propylcyclopentadiene, 2-methylcyclopentadiene, 5,5 - dimethylcyclopentadiene, 5,5 - diethylcyclopentadiene, 4,5 - dimethylcyclopentadiene, 1,5,5 - trimethylcyclopentadiene, 2,5,5 - trimethylcyclopentadiene, 2,5,5-triethylcyclopentadiene, 4-methyl - 5-ethylcyclopentadiene, 5-isopropylcyclopentadiene, and the like.

If $R_1$ is an alkyl group, it is preferred that it be one of 1 to 3 carbon atoms. In a particularly preferred embodiment of the present invention, the cyclopentadiene is one in which all of the $R_1$'s are hydrogen. This cyclopentadiene may be readily obtained by the dedimerization of dicyclopentadiene. As noted in the examples above, the dicyclopentadiene may be introduced directly into the present process without first being subjected to dedimerization to obtain the monomeric cyclopentadiene.

Usually, as a practical matter, it is preferred that the acyclic dienes be substantially free of impurities. However, it has been found that one of the most common and difficultly separable impurities, the alkyl acetylenes, may be present in admixture with the acyclic dienes with no adverse effect on the reaction of the acyclic dienes with the cyclopentadienes to form the alkylidene substituted norbornenes. It is known that acetylene will react with cyclopentadienes under conditions conducive to the formation of the alkylidene substituted norbornenes from a cyclopentadiene and acyclic dienes. However, quite surprisingly, methylacetylene and the higher alkyl acetylenes do not react under such conditions. As noted above, the alkyl acetylenes are common impurities in acyclic dienes and are often quite difficultly separable therefrom. In view of the finding that these acetylenes do not react under the conditions conducive to the reaction of acyclic dienes and cyclopentadienes to form alkylidene substituted norbornenes, this reaction may be used as a means of separating the acyclic dienes from the alkyl acetylenes. Further, such finding removes the need for complex separation means for recovering the acyclic dienes from admixture with the alkyl acetylenes. The finding that the reaction of acyclic dienes with cyclopentadienes to form alkylidene substituted norbornenes offers a means of separating the acyclic dienes from admixture with alkyl acetylenes is not limited to the particular conditions for producing the alkyl substituted norbornenes set forth herein. While such conditions are preferred for such a separation, it has been found that alkyl acetylenes may be separated from acyclic dienes by subjecting a mixture thereof to temperatures of 150 to 325° C. under autogenous pressures in the presence of a cyclopentadiene or cyclopentadiene precursor such as dicyclopentadiene. This has been demonstrated by subjecting a mixture of methylacetylene (35% by weight) and allene (35% by weight) with inert diluent (30% by weight) to a temperature of 180 to 195° C. and a pressure of 1950 to 2000 p.s.i.g. for 3½ hours in the presence of cyclopentadiene. None of the methylacetylene entered into the reaction while a yield of 5-methylene-2-norbornene of 48% (based on allene) was obtained.

The product of the present process, the alkylidene substituted norbornenes, results from the addition of one mole of the acyclic diene to one mole of the cyclopentadiene. Therefore, the acyclic diene and the cyclopentadiene will most often be used in a molar ratio of approximately 1:1 in carrying out the present process. Of course, if desired, the molar ratio may be varied considerably from this 1:1 ratio, ranging from 4:1 and higher to 1:4 and lower.

One of the most critical features of the process of the present invention is the temperature at which the reaction is carried out. This temperature will be within the range of 255 to 325° C. Preferably, a temperature within the range of 260 to 300° C. will be used. At the above temperatures, the reaction of the acyclic diene and the cyclopentadiene is substantially faster than at lower temperatures. In addition, substantially higher yields of the product alkylidene substituted norbornene is obtained. Quite surprisingly, fewer by-products are produced at these temperatures also.

The pressure under which this reaction is carried out is not critical within wide limits. Good results are obtained when the reactants are heated in a closed container under the autogenous pressure developed by the reactants and the operating conditions. Pressures ranging up to 2000 p.s.i.g. and higher may be used.

Reaction times may be varied widely. Usually times ranging from 0.5 minute to 4 hours at the 255 to 325° C. temperature are used. Best results are obtained using reaction periods ranging from 15 minutes to one hour.

Usually, the process of the present invention is carried out in the presence of a polymerization inhibitor. Quite surprisingly, however, it has been found that many ordinarily useful polymerization inhibitors are ineffective in the present process. For instance, when hydroquinone, a well-known polymerization inhibitor, is used in the present process, the result is a mass of by-product polymer. In order to carry out the present process successfully, it is usually necessary that it be carried out in the presence of a polymerization inhibitor such as tertiary butyl catechol. The amount of the inhibitor used may vary considerably but as a practical matter will usually be within 0.1 to 2.0% by weight of the total feed to the reaction.

The reaction vessel used in carrying out the process of the present invention may be constructed of any material which is inert to the reactants and is capable of withstanding the operating pressures. Reaction vessels made of glass, stainless steel and glass-lined steel are quite satisfactory.

The products produced by the present invention are alkylidene substituted norbornenes. Generally, these compounds are the 5-alkylidene-2-norbornenes. Depending upon the cyclopentadiene used, the norbornene nucleus may be substituted with one or more additional substituents. When the preferred reactants are used, however, the product produced by the present process is the 5-alkylidene-2-norbornene in which there are no substituents to the norbornene nucleus other than the alkylidene substituent.

As indicated above, the alkylidene substituted norbornenes produced by the present process are suitable for the production of polymers. These polymers are particularly useful in self-supporting films, coating compositions and in EP rubbers.

What is claimed is:
1. A process for the preparation of alkylidene substituted norbornenes consisting essentially of heating p-t-butylcatechol, an acyclic diene of the formula

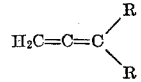

in which R represents hydrogen or a monovalent alkyl radical of 1 to 6 carbon atoms, in the absence of a polymerization initiator, with a cyclopentadiene of the formula

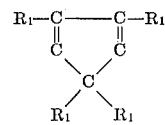

in which $R_1$ is hydrogen or an alkyl group of 1 to 6 carbon atoms, at a temperature of 255 to 325° C.

2. The process of claim 1 wherein the acyclic diene is one in which at least one of the R's is hydrogen and the other R is hydrogen or an alkyl radical of 1 to 3 carbon atoms.

3. The process of claim 1 wherein the acyclic diene is propadiene.

4. The process of claim 1 wherein the cyclopentadiene is one in which not more than two of the $R_1$'s are alkyl groups and in which the alkyl groups are of 1 to 3 carbon atoms.

5. The process of claim 1 wherein the cyclopentadiene is one in which all of the $R_1$'s are hydrogen.

6. The process of claim 1 wherein the molar ratio of acyclic diene to cyclopentadiene is within the range of 4:1 to 1:4.

7. The process of claim 1 wherein R is a straight-chain alkyl radical.

8. A process for the separation of acyclic dienes having the formula

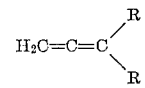

in which R represents hydrogen or a monovalent alkyl radical of 1 to 6 carbon atoms, from admixture with difficultly separable alkyl acetylenes consisting essentially of contacting a mixture thereof with a compound selected from the group consisting of cyclopentadiene and precursors of cyclopentadiene at a temperature of 150 to 325° C., thereby reacting said acyclic diene and a cyclopentadiene to form an alkylidene substituted norbornene, and separating said alkylidene substituted norbornene from said alkyl acetylenes.

9. The process of claim 7 wherein R is a straight-chain alkyl radical.

10. The process of claim 7 wherein the acyclic diene is one in which at least one of the R's is hydrogen and the other R is hydrogen or an alkyl radical of 1 to 3 carbon atoms.

11. The process of claim 7 wherein the acyclic diene is propadiene.

12. The process of claim 7 wherein the molar ratio of acyclic diene to cyclopentadiene is within the range of 4:1 to 1:4.

13. The process of claim 7 wherein the temperature is within the range of 255 to 325° C.

References Cited
UNITED STATES PATENTS

| | | | |
|---|---|---|---|
| 2,960,541 | 11/1960 | Elam | 260—666 |
| 3,093,620 | 6/1963 | Gladding et al. | 260—80.5 |
| 3,093,621 | 6/1963 | Gladding | 260—80.5 |
| 3,144,491 | 8/1964 | O'Connor | 260—666 |
| 3,151,173 | 9/1964 | Nyce | 260—666 |

DELBERT E. GANTZ, *Primary Examiner.*

V. O'KEEFE, *Assistant Examiner.*